United States Patent
Kim et al.

(10) Patent No.: US 6,930,859 B2
(45) Date of Patent: Aug. 16, 2005

(54) ACTUATOR LOCKING APPARATUS FOR HARD DISK DRIVE

(75) Inventors: Do-wan Kim, Suwon-si (KR); Byoung-gyou Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 10/619,490

(22) Filed: Jul. 16, 2003

(65) Prior Publication Data

US 2004/0012890 A1 Jan. 22, 2004

(30) Foreign Application Priority Data

Jul. 16, 2002 (KR) ........................................ 2002-41587

(51) Int. Cl.[7] ............................................... G11B 5/54
(52) U.S. Cl. .................................................. 360/256.2
(58) Field of Search ..................................... 360/256.2

(56) References Cited

U.S. PATENT DOCUMENTS 5,663,855 A * 9/1997 Kim et al. ............... 360/256.2
6,108,173 A * 8/2000 Iwabuchi ................. 360/256.2
6,654,207 B2 * 11/2003 Hong et al. .............. 360/256.2

FOREIGN PATENT DOCUMENTS

| KR | 2000-20323 | 4/2000 |
| KR | 2002-27525 | 4/2002 |

* cited by examiner

*Primary Examiner*—Robert S. Tupper
(74) *Attorney, Agent, or Firm*—Staas & Halsey LLP

(57) ABSTRACT

An actuator locking apparatus of a hard disk drive locking an actuator using a magnetic force of a magnet attached to a first surface of a first yoke, with a metal piece installed at an end portion of an arm of the actuator, a contact portion protruding from a side surface of a second yoke, and bent such that an interval between a first contact surface of the contact portion facing the actuator and the actuator is greater than an interval between a second surface of the second yoke facing the actuator and the actuator, and a bending portion protruding from an edge of the first yoke and bent toward and extending to the contact portion, so that a second contact surface of an end portion of the bending portion contacts the first contact surface, and having a slot of predetermined width corresponding to the metal piece.

20 Claims, 7 Drawing Sheets

ACTUATOR LOCKING APPARATUS FOR HARD DISK DRIVE

CROSS-REFERENCE TO RELATED APPLICATIONS

This application claims the priority of Korean Patent Application No. 2002-41587 filed Jul. 16, 2002 in the Korean Intellectual Property Office, the disclosure of which is incorporated herein in its entirety by reference.

BACKGROUND OF THE INVENTION

1. Field of the Invention

The present invention relates to a hard disk drive, and more particularly, to n apparatus to lock an actuator of a hard disk drive, to prevent a magnetic head from escaping from a parking zone of a disk when the disk is stopped.

2. Description of the Related Art

Hard disk drives (HDDs) are auxiliary memory devices of a computer to read out data stored on a magnetic disk and record data on the magnetic disk using a magnetic head.

FIG. 1 is a plan view illustrating a conventional hard disk drive. FIG. 2 is an exploded perspective view illustrating a conventional actuator and a voice coil motor.

Referring to FIGS. 1 and 2, a conventional hard disk drive includes a magnetic disk (hard disk) 20 which is a recording medium for recording data, a spindle motor 30 installed on a base plate 10, to rotate the disk 20, and an actuator 40 having a magnetic head 41 to record and reproduce data on and from the disk 20.

In the conventional hard disk drive, a plurality of disks are installed to increase a data storage capacity. Recently, one or two disks are sufficient to store data, as a surface recording density of a disk has sharply increased. In particular, a hard disk drive using a single disk, in which data is recorded on only one side of the disk, has been developed. In this case, since only one magnetic head and one arm are needed, a slim hard disk drive is available. Conventionally, a voice coil motor having a magnet provided at each of the upper and lower sides of the coil has been mainly used. However, as shown in the drawings, for the actuator 40 having only one arm 46 for one disk, the voice coil motor 50 of a one-magnet type, in which the magnet 53 is installed at either the upper side or lower side of the coil 56 is mainly used. Since the entire height of the voice coil motor 50 can be reduced, manufacturing a slim hard disk drive is simplified.

Typically, a plurality of the disks 20 are provided and separated by a predetermined distance from each other, and the disks 20 are rotated by the spindle motor 30. A parking zone 21 is provided at an inner circumferential side of the disk 20, in which a slider 42, on which the magnetic head 41 is mounted, is disposed when the power is turned off. A data zone 22 is provided outside the parking zone 21, in which a magnetic signal is recorded.

The actuator 40 pivots around a pivot shaft 47 provided on the base plate 10. The actuator 40 has an arm 46, and a pivot hole 48 is located in the middle of the arm 46 so that the arm 46 is coupled to the pivot shaft 47. A suspension 44, supporting the slider 42 so that the slider 42 is elastically biased toward a surface of the disk 20, is installed at one end portion of the arm 46. A coil 56 of the voice coil motor (VCM) 50 is coupled to an other end portion of the arm 46 by interposing a molding portion 55. The actuator 40 is actuated by the VCM 50.

The VCM 50 includes the coil 56 installed on the arm 46 as described above. A lower yoke 51 is fixedly installed on the base plate 10 with a predetermined interval under the coil 56. An upper yoke 52 is installed above the coil 56, and is coupled to the lower yoke 51 by a screw 59. A magnet 53 is attached to the bottom surface of the upper yoke 52 and is separated a predetermined distance from the coil 56.

In the conventional hard disk drive having the above structure, while data is recorded and reproduced, a lifting force from the rotation of the disk 20 and an elastic force from the suspension 44 are applied to the slider 42. Accordingly, the slider 42 is lifted and maintained at a height where the lifting force and the elastic force are balanced above the data zone 22 of the disk 20. Thus, the magnetic head 41 mounted on the slider 42 maintains a predetermined interval with the disk 20 and records and reproduces data with respect to the disk 20.

When the power is turned off and the disk 20 stops rotating, the lifting force lifting the slider 42 disappears. Consequently, the slider 42 must be moved out of the data zone 22 of the disk 20 in advance, to prevent damage to the data zone 22 caused by the slider 42 contacting the data zone 22. That is, the VCM 50 drives the arm 46 of the actuator 40 to move above the parking zone 21 of the disk 20 before the rotation of the disk 20 is completely stopped, and the slider 42 safely lands in the parking zone 21 even when the disk 20 is completely stopped. Thus, damage to the data zone 22 can be prevented.

When the power is turned on and the disk 20 resumes rotating, the lifting force is generated again and accordingly the slider is lifted. The slider 42 in a lifted state is moved to the data zone 22 of the disk 20 as the arm 46 pivots by the VCM 50. Then, the magnetic head 41 mounted on the slider 42 performs recording and reproduction of data with respect to the data zone 22 of the disk 20.

An actuator locking apparatus 60, to lock and prevent the actuator 40 from pivoting after the slider 42 is accommodated in the parking zone 21 of the disk 20, is provided in the hard disk drive. That is, when the power is turned off, if the hard disk drive is subjected to an external impact, the actuator locking apparatus 60 prevents the actuator 40 from pivoting, and thereby prevents the magnetic head 41 from moving to the data zone 22 from the parking zone 21.

The actuator locking apparatus 60 includes a metal piece 63 installed at the other end portion of the arm 46, a bending portion 66 provided at the upper yoke 52 and having a slot 67 of predetermined width, and a contact portion 64 provided at the lower yoke 51 and contacting a lower surface of the bending portion 66.

The structure and problems of the conventional actuator locking apparatus are described below with reference to the accompanying drawings.

FIG. 3 is a side view of a VCM portion to explain the conventional actuator locking apparatus. FIG. 4 is a perspective view illustrating the conventional actuator locking apparatus. FIG. 5 is a view for explaining the problems of the conventional actuator locking apparatus. Here, the same reference numerals as those shown in FIGS. 1 and 2 indicate the same elements having the same functions.

Referring to FIGS. 3 through 5, the bending portion 66 is bent downward from an edge of the upper yoke 52 of the VCM 50. The contact portion 64, contacting the lower surface of the bending portion 66, protrudes from the edge of the lower yoke 51. The slot 67 of predetermined width is located in the bending portion 66 along a center line C of the arm 46. A coupling protrusion 61 protrudes from the other end portion of the arm 46. A damper 62 is inserted around the coupling protrusion 61, and the metal piece 63 is attached to one side of the damper 62.

The yoke 52 is magnetized by the magnet 53 attached to the bottom surface thereof. Accordingly, a magnetic flux flows from the bending portion 66 of the upper yoke 52 to the contact portion 64 of the lower yoke 51. The magnetic flux leaks around the slot 67 and, due to the leakage of the magnetic flux, the metal piece 63 provided at the arm 46 adheres to the bending portion around the slot 67.

In the above actuator locking apparatus 60, since a magnet is not provided on the upper surface of the lower yoke 51, a distance between the arm 46 and the lower yoke 51 is very narrow. Thus, the height of a lower portion of the bending portion 66 is very short. Since the metal piece 63 provided at the arm 46 accurately adheres to the bending portion 66 around the slot 67 when the center of the metal piece 63 matches the center of the slot 67, the center of the slot 67 must be disposed on the center line C of the arm 46. Thus, it is not possible to arbitrarily set the position of the slot 67 higher than the center line C of the arm 46 to increase the height of the lower portion of the bending portion 66.

Due to the above structural limit of the conventional actuator locking apparatus 60, the lower portion of the bending portion 66, having a low height, can be easily bent during an assembly process of the lower yoke 51 and the upper yoke 52. In particular, the length of the bending portion 66 is typically designed to be slightly greater than the interval between the upper yoke 52 and the lower yoke 51 to improve the contact between the bending portion 66 and the contacting portion 64. In this case, the lower portion of the bending portion 66 can be easily bent. When the lower portion of the bending portion 66 is bent, a contact area between the bending portion 66 and the contact portion 64 decreases, so that a magnetic flux flowing from the bending portion 66 to the contact portion 64 decreases. Accordingly, the leakage of the magnetic flux around the slot 67 decreases. Also, the attachment between metal piece 63 and the bending portion 66 becomes unstable.

To prevent the contact portion 64 from interfering with the metal piece 63 contacting a side surface of the bending portion 66, a side surface of the contact portion 64 towards the metal piece 63 is offset slightly by a distance D1 behind the side surface of the bending portion 66. Accordingly, the entire lower surface of the bending portion 66 does not contact an upper surface of the contact portion 64, and thus, the magnetic flux flowing from the bending portion 66 to the contact portion 64 decreases.

Since the above problems weaken the attaching force between the metal piece 63 and the bending portion 66, the metal piece 63 can be easily detached from the bending portion 66 by a relatively small external impact. Accordingly, the arm 46 of the actuator 40 pivots and the magnetic head contacts the data zone of the disk, possibly damaging the data zone of the disk. Also, since the condition of an attaching force between the metal piece 63 and the bending portion 66 being under an allowed standard is considered as being defective, productivity in manufacturing hard disk drives is lowered.

SUMMARY OF THE INVENTION

To solve the above and/or other problems, the present invention provides an actuator locking apparatus of a hard disk drive having a structure to realize more stable actuator locking, by making a metal piece installed at the actuator firmly contact a bending portion provided at a yoke.

According to an aspect of the present invention, there is provided an actuator locking apparatus of a hard disk drive locking an actuator using a magnetic force of a magnet attached to a first surface of a first yoke of a voice coil motor, facing the actuator, with the first yoke and a second yoke of a voice coil motor installed at opposing sides of the actuator to face each other, so that a magnetic head installed at the actuator is maintained in a state of being parked in a parking zone of a disk, the actuator locking apparatus having a metal piece installed at an end portion of an arm of the actuator, a contact portion protruding from a side surface of the second yoke and bent such that an interval between the actuator and a first contact surface of the contact portion facing the actuator is greater than an interval between the actuator and a second surface of the second yoke facing the actuator, and a bending portion protruding from an edge of the first yoke and bent toward the contact portion, extending to the contact portion so that a second contact surface of an end portion of the bending portion contacts the first contact surface of the contact portion, and having a slot of predetermined width corresponding to the metal piece.

According to one aspect, a difference in height between the first contact surface of the contact portion and the second surface of the second yoke is approximately half of a thickness of the second yoke.

According to one aspect, the entire second contact surface of the bending portion contacts the first contact surface of the contact portion.

According to one aspect, a side surface of the contact portion facing the metal piece is flush with a side surface of the bending portion facing the metal piece.

According to one aspect, the side surface of the contact portion facing the metal piece protrudes farther toward the metal piece than the side surface of the bending portion facing the metal piece.

According to one aspect, the first yoke is an upper yoke of the actuator, the second yoke is a lower yoke of the actuator, and the magnet is installed on a bottom surface of the upper yoke.

According to one aspect, the first yoke is a lower yoke of the actuator, the second yoke is an upper yoke of the actuator, and the magnet is installed on an upper surface of the lower yoke.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION

Figure 1:
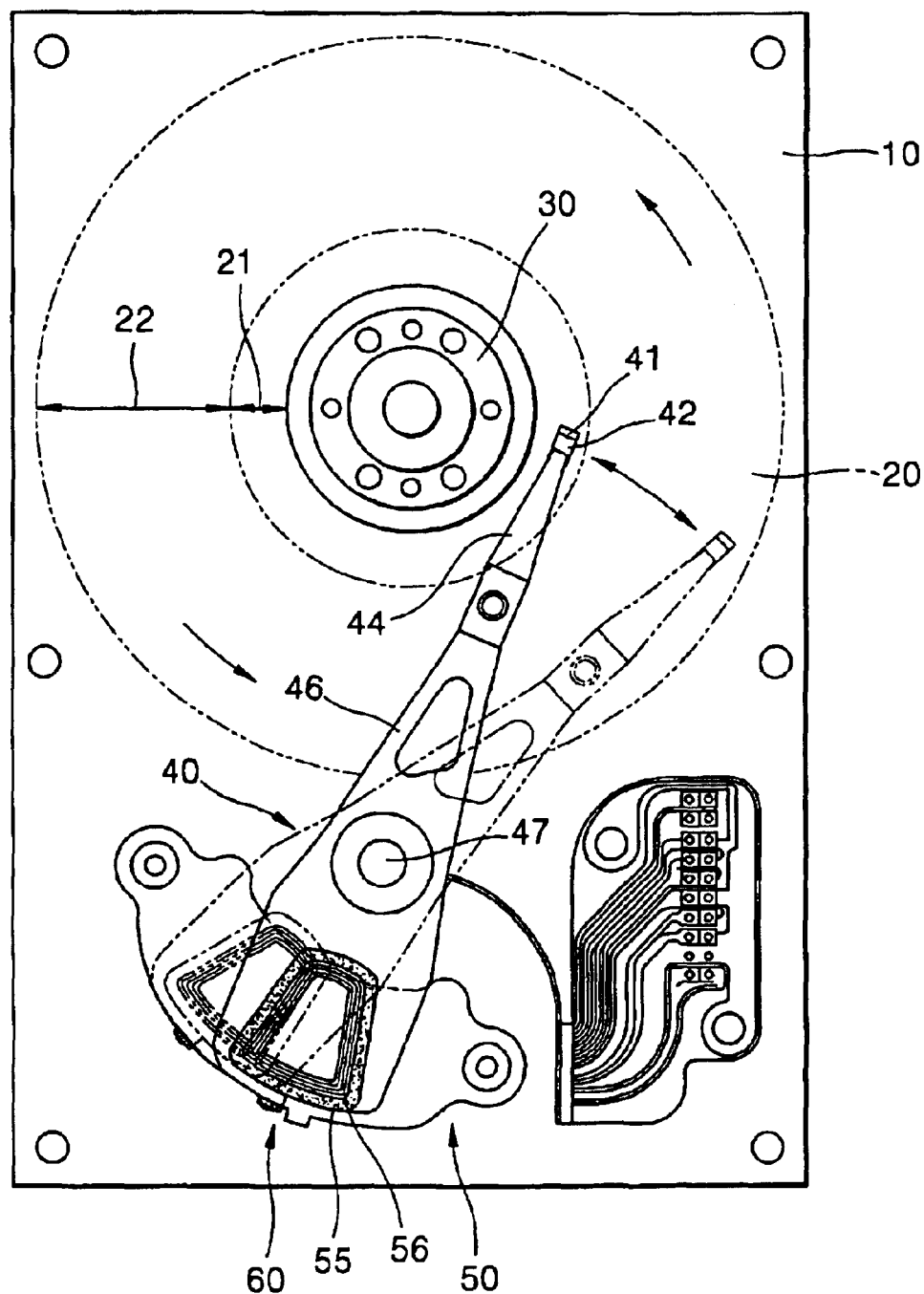
FIG. 1 is a plan view illustrating a conventional hard disk drive.
Figure 2:
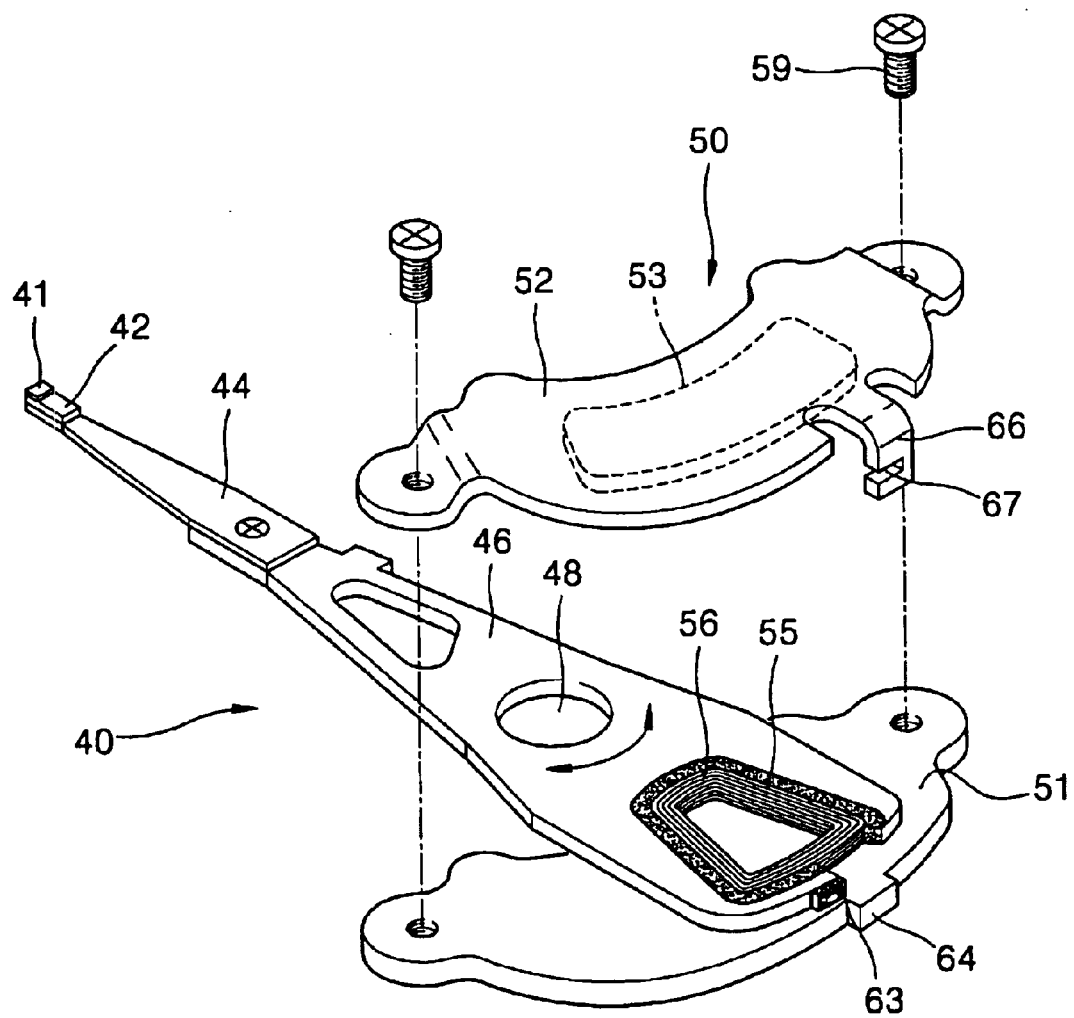
FIG. 2 is an exploded perspective view illustrating the conventional actuator and VCM.
Figure 3:
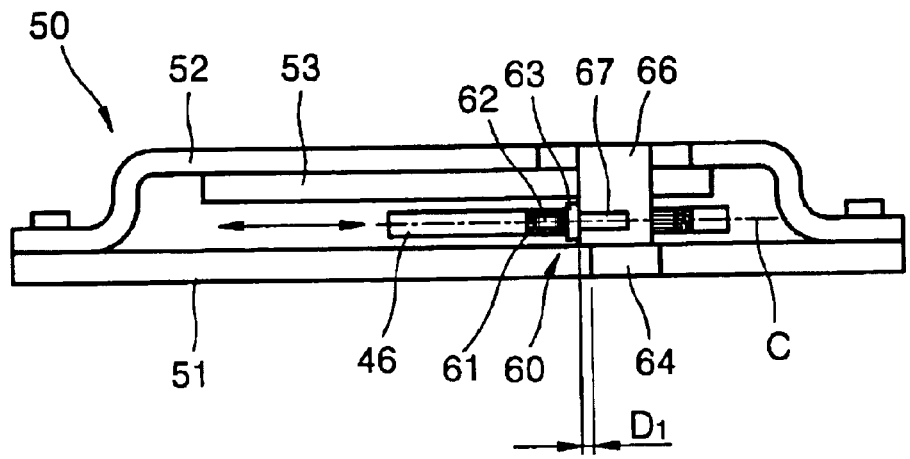
FIG. 3 is a side view illustrating the VCM.
Figure 4:
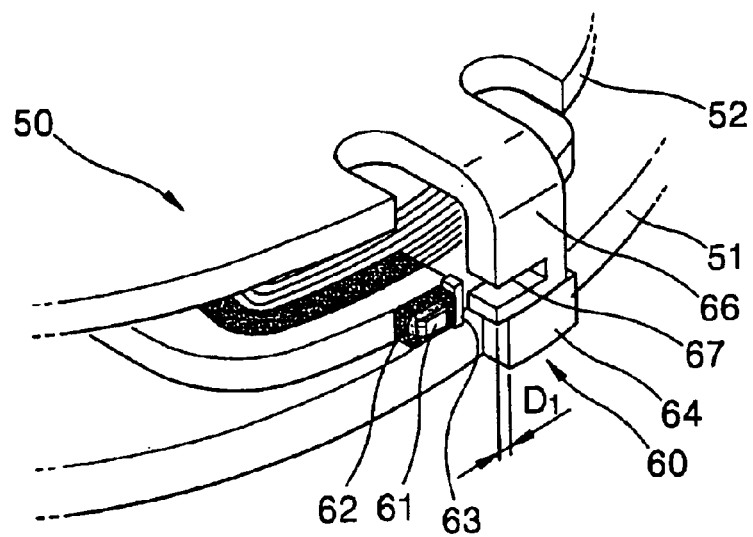
FIG. 4 is a perspective view illustrating a conventional actuator locking apparatus.
Figure 5:
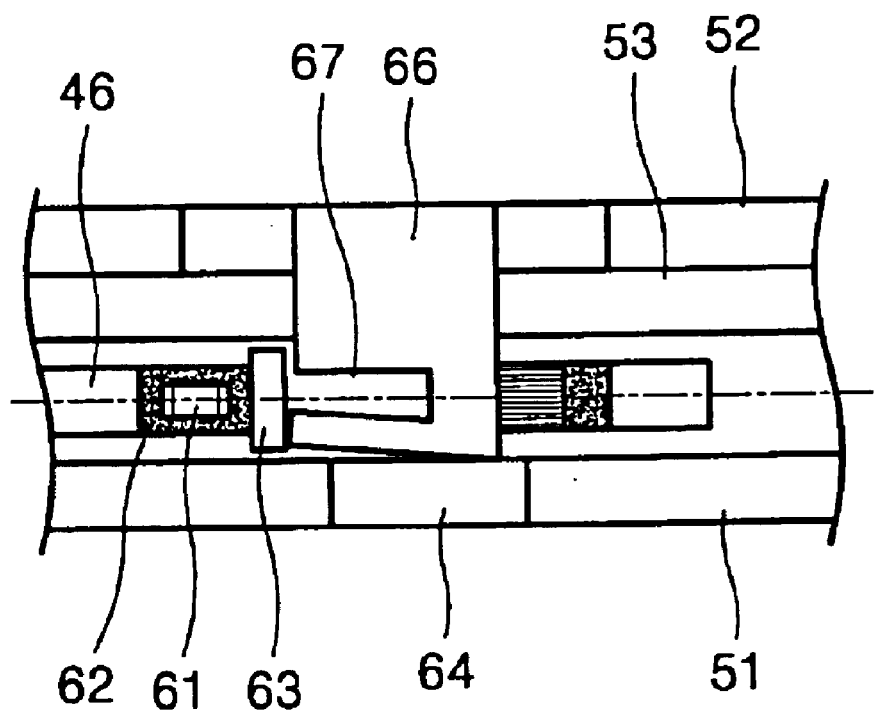
FIG. 5 is a view for explaining the problems of the conventional actuator locking apparatus of FIG. 4.

Reference will now be made in detail to embodiments of the present invention, examples of which are illustrated in the accompanying drawings, wherein like reference numerals refer to the like elements throughout. The embodiments described below explain the invention by referring to the figures.

The following is a description of an embodiment of an actuator locking apparatus of a hard disk drive according to the present invention, in which a magnet is attached to a bottom surface of an upper yoke.

Figure 6:
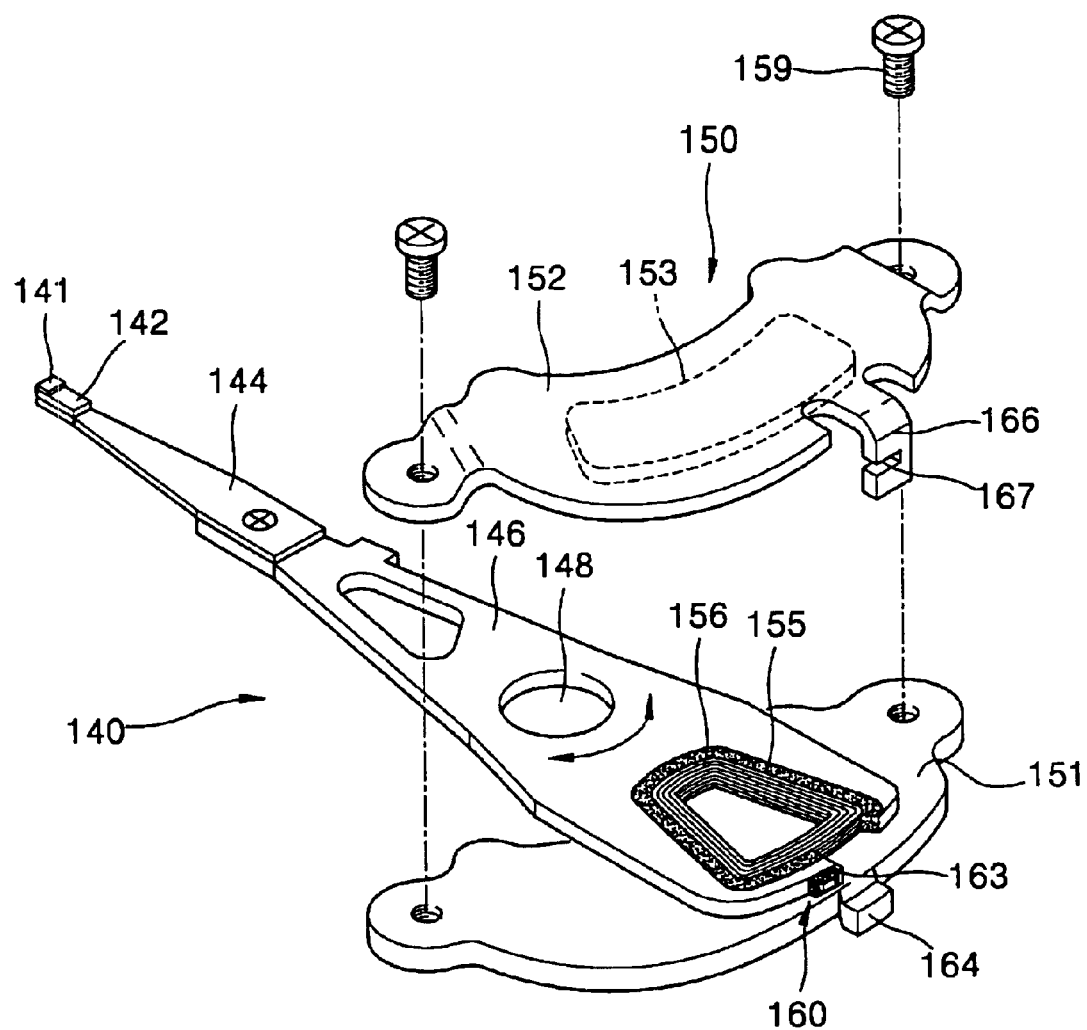
FIG. 6 is an exploded perspective view illustrating an actuator and a voice coil motor adopting an actuator locking apparatus according to an embodiment of the present invention.

Referring to FIG. 6, an actuator 140 to move a magnetic head 141 to a predetermined position on a disk is provided to record and reproduce data with respect to a hard disk drive. The actuator 140 has an arm 146 capable of pivoting installed on a base plate of a hard disk drive. A pivot hole 148 is located in a middle portion of the arm 146. According to one aspect, the arm 146 is manufactured by press processing or stamping processing a metal material, for example, an aluminum plate. A suspension 144, to support a slider 142 on which the magnetic head 141 is mounted to elastically bias the magnet head toward a surface of the disk, is installed at one end portion of the arm 146.

A voice coil motor 150 to pivot the actuator 140 is installed in the hard disk drive. The voice coil motor 150 has a coil 156 coupled to an other end portion of the arm 146, a lower yoke 151 installed under the coil 156, the upper yoke 152 installed above the coil 156, and the magnet 153 attached to the bottom surface of the yoke 152.

The coil 156 is coupled to the arm 146 by interposing a molding portion 155. In detail, the molding portion 155 is formed by injection molding plastic resin between the coil 156 and the arm 146.

The lower yoke 151 is fixedly installed on the base plate 10 (refer to FIG. 1) of the hard disk drive at a predetermined interval from the coil 156. The upper yoke 152 is coupled to the lower yoke 151 by a screw 159. The magnet 153 is attached to the bottom surface of the upper yoke 152 and separated by a predetermined distance from the coil 156. According to one aspect, a permanent magnet is used as the magnet 153.

The voice coil motor 150 having the above structure is controlled by a servo control system, and pivots the actuator 140 in a direction according to Fleming's left hand rule, by the interaction of current applied to the coil 156 and a magnetic field formed by the magnet 153. That is, when the power of the hard disk drive is turned on to rotate the disk, the voice coil motor 150 pivots the arm 146 and moves the magnetic head 141 from the parking zone 21 of the disk to the data zone 22 (see FIG. 1). Conversely, when the power of the hard disk drive is turned off and the disk stops rotating, the voice coil motor 150 pivots the arm 146 and moves the magnetic head 141 from the data zone 22 of the disk to the parking zone 21 so that the magnetic head 141 is disposed in the parking zone.

An actuator locking apparatus 160 is provided in the hard disk drive. When the power of the hard disk drive is turned off, the actuator locking apparatus 160 locks the actuator 140 to maintain the magnetic head 141 parked in the parking zone of the disk. That is, the actuator locking apparatus 160 prevents the actuator 140 from being moved by an external impact of predetermined magnitude when the power is turned off, so that the magnetic head 141 is not moved from the parking zone 21 to the data zone 22. As previously noted, if the magnetic head 141 is moved to the data zone when the power is turned off, the magnetic head 141 directly contacts the data zone, and the data zone and the magnetic head 141 can be damaged.

The actuator locking apparatus 160 locks the actuator 140 by using a magnetic force of the magnet 153 attached to the bottom surface of the upper yoke 152 of the voice coil motor 150. The actuator locking apparatus 160 has a metal piece 163 installed at the other end portion of the arm 146, a bending portion 166 provided at the upper yoke 152 and having a slot 167 of predetermined width, and a contact portion 164 provided at the lower yoke 151 and contacting a bottom surface of the bending portion 166. The contact portion 164 protrudes from a side surface of the lower yoke 151, and is bent, such that an upper surface of the contact portion 164 is lower than an upper surface of the lower yoke 151.

Figure 7:
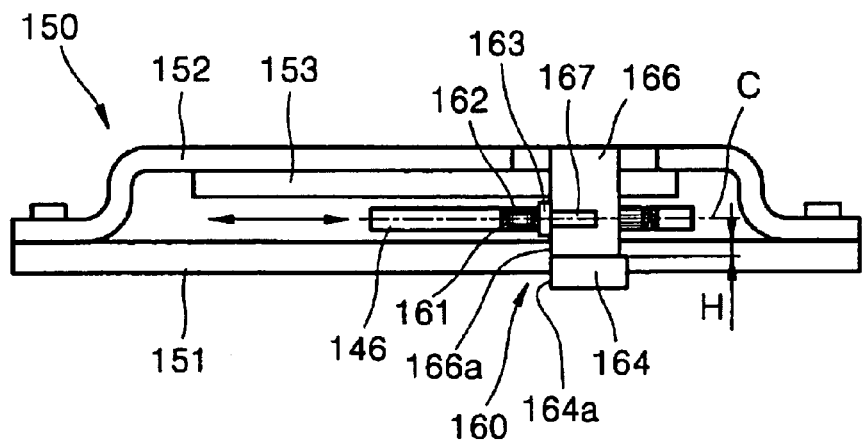
FIG. 7 is a side view illustrating the voice coil motor portion for explaining the actuator locking apparatus of FIG. 6.
Figure 8:
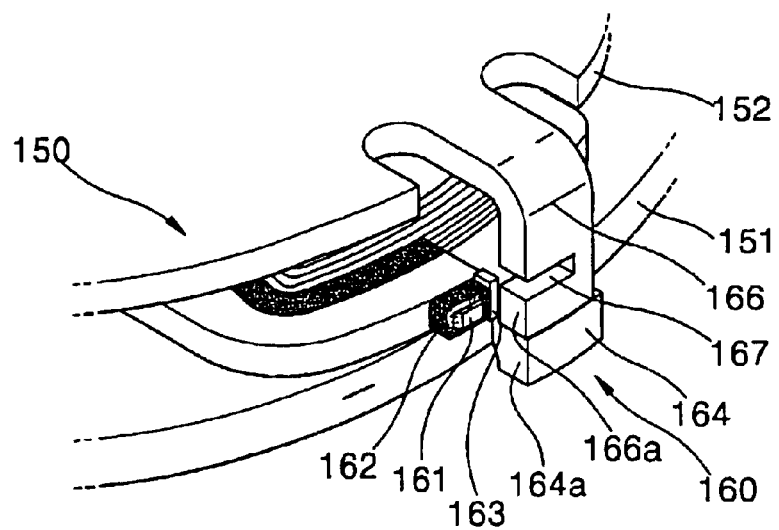
FIG. 8 is a perspective view illustrating the actuator locking apparatus of FIG. 6.

The structure and operation of the actuator locking apparatus 160 according to the present invention will now be described with reference to the following drawings. FIG. 7 illustrates a voice coil motor portion for explaining the actuator locking apparatus. FIG. 8 illustrates the actuator locking apparatus. Here, the same reference numerals as those in FIG. 6 indicate the same elements having the same functions.

Referring to FIGS. 7 and 8, the actuator locking apparatus 160 has the metal piece 163 installed at the other end portion of the arm 146. A coupling protrusion 161 protrudes from the other end portion of the arm 146. A damper 162 is inserted around the coupling protrusion 161, and the metal piece 163 is attached to a side surface of the damper 162. According to one aspect, the damper 162 is made of a flexible material, for example, rubber. According to one aspect, the metal piece 163 is made of stainless steel, and is attached to the one side surface of the damper 162 facing a side surface 166a of the bending portion 166. The metal piece 163 is attached such that a center of the metal piece 163 aligns with a center line C of the arm 146.

The bending portion 166 protrudes from an edge of the upper yoke 152, is bent downward, and extends to the contact portion 164 so that a bottom surface of the bending portion 166 contacts the upper surface of the contact portion 164. The slot 167 of predetermined width is located in the bending portion at a height corresponding to the metal piece 163, that is, at a height aligning with the center line C of the arm 146.

As previously noted, the upper surface of the contact portion 164 is formed to be lower than the upper surface of the lower yoke 151. Thus, even when a magnet is not provided on the upper surface of the lower yoke 151, a sufficient interval between the slot 167 and the contact portion 164 is obtained. Accordingly, since the height of a lower portion of the bending portion 166 increases compared with the conventional hard disk drive, the strength of the lower portion of the bending portion 166 increases. Also, a likelihood that the lower portion of the bending portion 166 will be bent during an assembly step of the lower yoke 151 and the upper yoke 152 is decreased.

According to one aspect, a height difference H between the upper surface of the contact portion 164 and the upper surface of the lower yoke 151 is half the thickness of the lower yoke 151. When the height difference H is too small, the height of the lower portion of the bending portion 166 is not sufficiently great.

According to one aspect, a side surface 164a of the contact portion 164 facing the metal piece 163 and the side surface 166a of the bending portion 166 are flush with each other. Thus, since the entire bottom surface of the bending portion 166 contacts the upper surface of the contact portion 164, a sufficient contact area between them is achieved.

When the upper surface of the contact portion 164 is formed lower than the upper surface of the lower yoke 151, the metal piece 163 does not contact the contact portion 164. Thus, even if the lower yoke 151 and the upper yoke 152 are slightly misaligned when being assembled, the metal piece 163 completely contacts the side surface 166a of the bending portion 166.

The upper yoke 152 is magnetized by the magnet 153 attached to the bottom surface of the upper yoke 152. Accordingly, a magnetic flux flows from the bending portion 166 of the upper yoke 152 to the contact portion 164 of the lower yoke 151. The magnetic flux leaks from a portion where the slot 167 is disposed. The metal piece 163 installed at the arm 146 adheres to the side surface 166a of the bending portion 166 around the slot 167 because of the flux leakage.

In the actuator locking apparatus 160 operating as above, since the lower portion of the bending portion 166 is not bent, the bottom surface of the bending portion 166 and the upper surface of the contact portion 164 can completely contact each other, thereby ensuring a sufficient contact area therebetween. Also, the attachment between the metal piece 163 and the bending portion 166 is securely made. Thus, as the magnetic flux flowing from the bending portion 166 to the contact portion 164 increases, and the flux leakage around the slot 167 increases, the metal piece 163 magnetically adheres more strongly and stably to the bending portion 166.

As a result, since the attachment force between the metal piece 163 and the bending portion 166 is stably maintained, the actuator is stably locked when the power is turned off.

Furthermore, a conventional problem that the lower portion of the bending portion 166 is bent during assembly is avoided. Thus, a defective proportion of manufactured hard disk drives due to a low attachment force between the metal piece 163 and the bending portion 166 is reduced, thereby increasing manufacturing efficiency.

Figure 9:
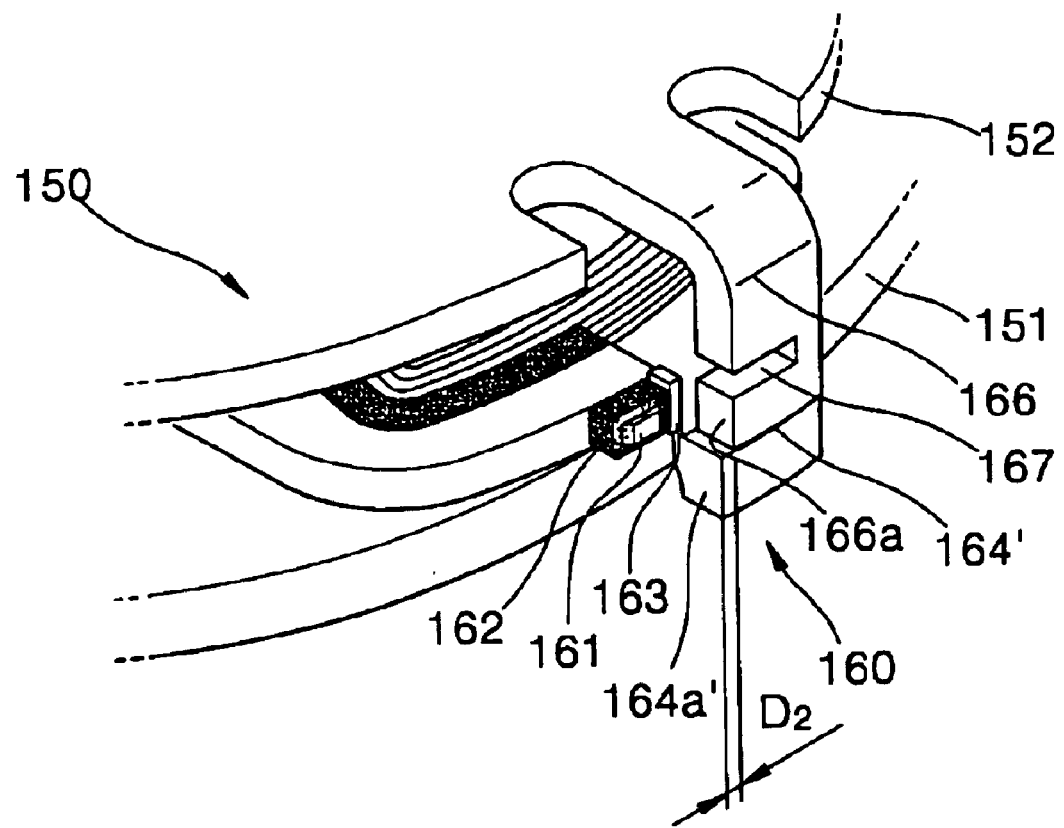
FIG. 9 is a perspective view illustrating a modified example of a contact portion of FIG. 8.

FIG. 9 shows a modified example of the contact portion of FIG. 8. Here, the same reference numerals as those in FIG. 8 indicate the same elements having the same functions.

Referring to FIG. 9, a left side surface 164a' of a contact portion 164' protrudes beyond the side surface 166a of the bending portion 166 by a distance D2. Thus, if there is a slight deviation of placement when the lower yoke 151 and the upper yoke 152 are assembled, since there is an allowance as long as a distance D2, the entire lower surface of the bending portion 166 still contacts the upper surface of the contact portion 164'.

As described above, since the height of the lower portion of the bending portion 166 increases to improve a strength thereof, the conventional problem that the lower portion of the bending portion 166 is bent during the assembly of the upper yoke 152 and the lower yoke 151 is solved, and a contact area between the bending portion 166 and the contact portion 164 increases. Thus, the metal piece 163 installed at the actuator more firmly contacts the bending portion 166, and the attachment force therebetween increases, so that the actuator 140 is locked more stably. Furthermore, since the conventional problem that the lower portion of the bending portion 166 is bent is solved, the defective proportion of manufactured hard disk drives is lowered and production efficiency is increased.

In the prior description of embodiments of the present invention, the magnet is attached to the lower surface of the upper yoke. But according to another aspect, the magnet is attached to the upper surface of the lower yoke. In this case, the contact portion is formed at the upper yoke and the bending portion is formed at the lower yoke.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An actuator locking apparatus of a hard disk drive locking an actuator using a magnetic force of a magnet attached to a first surface of a first yoke of a voice coil motor, facing the actuator, with the first yoke and a second yoke of the voice coil motor installed at opposing sides of the actuator to face each other, so that a magnetic head installed at the actuator is maintained in a state of being parked in a parking zone of a disk, the actuator locking apparatus comprising:

a metal piece installed at an end portion of an arm of the actuator;

a contact portion protruding from a side surface of the second yoke, and bent such that an interval between a first contact surface of the contact portion facing the actuator and the actuator, is greater than an interval between a second surface of the second yoke facing the actuator and the actuator; and a bending portion protruding from an edge of the first yoke and bent toward the contact portion, extending to the contact portion so that a second contact surface of an end portion of the bending portion contacts the first contact surface of the contact portion, and having a slot of predetermined width corresponding to the metal piece.

2. The apparatus as claimed in claim 1, wherein:

a difference in height between the first contact surface of the contact portion and the second surface of the second yoke is approximately half of a thickness of the second yoke.

3. The apparatus as claimed in claim 1, wherein:

the entire second contact surface of the bending portion contacts the first contact surface of the contact portion.

4. The apparatus as claimed in claim 3, wherein:

a side surface of the contact portion facing the metal piece is flush with a side surface of the bending portion facing the metal piece.

5. The apparatus as claimed in claim 3, wherein:

a side surface of the contact portion facing the metal piece protrudes farther toward the metal piece than a side surface of the bending portion facing the metal piece.

6. The apparatus as claimed in claim 1, wherein:

the first yoke is an upper yoke of the actuator, the second yoke is a lower yoke of the actuator, and the magnet is installed on a bottom surface of the upper yoke.

7. The apparatus as claimed in claim 1, wherein:

the first yoke is a lower yoke of the actuator, the second yoke is an upper yoke of the actuator, and the magnet is installed on an upper surface of the lower yoke.

8. The apparatus as claimed in claim 1, wherein:
the metal piece is magnetically adhered to the bending portion to maintain the magnetic head in the parking zone.

9. An actuator locking apparatus of a hard disk drive, comprising:
an actuator that pivots, with a coupling protrusion at a first end thereof;
a metal piece attached to the coupling protrusion;
first and second yokes of a voice coil motor, with respective opposing first and second surfaces;
a contact portion protruding from the second yoke, with a first contact surface approximately parallel to the second surface, where a distance between the first contact surface and a plane formed by the actuator is greater than a distance between the second surface and the plane;
a bending portion extending from the first yoke
with a second contact surface that contacts the first contact surface, and
a slot of predetermined width that corresponds to the metal piece; and
a magnet attached to the first yoke, that magnetizes the bending portion to attract and magnetically adhere the metal piece to the bending portion at the slot, and lock the actuator in a predetermined position.

10. The apparatus according to claim 9, wherein:
a distance between a plane formed by the first contact surface and a plane formed by the second surface is approximately half of a thickness of the second yoke.

11. The apparatus according to claim 9, further comprising:
a damper made of a flexible material and interposed between the coupling protrusion and the metal piece.

12. The apparatus according to claim 11, wherein:
the damper is made of rubber.

13. The apparatus according to claim 9, wherein:
the metal piece is stainless steel.

14. The apparatus according to claim 9, wherein:
the magnet is a permanent magnet.

15. The apparatus according to claim 9, wherein:
a side surface of the bending portion that contacts the metal piece when the actuator is locked is flush with a side surface of the contact portion.

16. The apparatus according to claim 9, wherein:
a side surface of the bending portion that contacts the metal piece when the actuator is locked is offset by a predetermined distance from a side surface of the contact portion.

17. The apparatus according to claim 9, wherein:
the metal piece does not contact the contact portion.

18. An actuator locking apparatus of a hard disk drive, comprising:
an actuator with a coupling protrusion at a first end thereof;
a voice coil motor to pivot the actuator, comprising
a first yoke with a first surface
a second yoke with a second surface opposing the first yoke, with the actuator disposed between the first and second yokes, and
a magnet attached to the first yoke;
a metal piece attached to the coupling protrusion;
a contact portion protruding from the second yoke, with a first contact surface approximately parallel to the second surface, where a distance between the first contact surface and a plane formed by the actuator is greater than a distance between the second surface and the plane; and
a bending portion extending form the first yoke
with a second contact surface that contacts the first contact surface, and
a slot of predetermined width that corresponds to the metal piece, wherein
the magnet magnetizes the bending portion to bias the metal piece toward the bending portion, and magnetically adhere the metal piece to the bending portion at the slot, and lock the actuator in a predetermined position.

19. An actuator locking apparatus of a hard disk drive, comprising:
a first yoke with a first surface;
a second yoke;
an actuator disposed between the first and second yokes;
a contact portion protruding from the first yoke, with a first contact surface approximately parallel to the first surface,
wherein the contact portion is bent such that a distance between the first contact surface and a plane formed by the actuator is greater than a distance between the first surface and the plane.

20. A yoke of an actuator locking apparatus including an actuator, the yoke comprising:
a first surface;
a contact portion with a first contact surface, protruding from the first yoke,
wherein the contact portion is bent such that a distance between the first contact surface and a plane formed by the actuator is greater than a distance between the first surface and the plane.

* * * * *

UNITED STATES PATENT AND TRADEMARK OFFICE
CERTIFICATE OF CORRECTION

PATENT NO. : 6,930,859 B2 Page 1 of 1
APPLICATION NO. : 10/619490
DATED : August 16, 2005
INVENTOR(S) : Do-wan Kim et al.

It is certified that error appears in the above-identified patent and that said Letters Patent is hereby corrected as shown below:

On The Front Page: Column 1, Line 1 in The Title (54), replace "FOR" with --OF--.

Signed and Sealed this

Twenty-first Day of November, 2006

JON W. DUDAS
*Director of the United States Patent and Trademark Office*